United States Patent

[11] 3,626,389

[72] Inventor Sigurd G. Waaben Princeton, N.J.
[21] Appl. No. 864,705
[22] Filed Oct. 8, 1969
[45] Patented Dec. 7, 1971
[73] Assignee Bell Telephone Laboratories, Incorporated Murray Hill, N.J.

[54] CROSS-POINT MATRIX MEMORY USING STORED CHARGE
10 Claims, 6 Drawing Figs.

[52] U.S. Cl. .......... 340/173 R, 307/238, 307/319, 307/320
[51] Int. Cl. .......... G11c 11/36
[50] Field of Search .......... 340/173 SP, 173; 307/238, 319, 320

[56] References Cited
UNITED STATES PATENTS
3,134,028 5/1964 Jensen .......... 307/320
3,356,998 12/1967 Kaufman .......... 307/319

*Primary Examiner*—Terrell W. Fears
*Attorneys*—R. J. Guenther and Kenneth B. Hamlin

ABSTRACT: A cross-point matrix memory including, in each cross-point circuit, a memory cell having a charge storage diode and a metal semiconductor diode in a series aiding circuit arrangement. An information bit is written into any selected memory cell by forward biasing both diodes of the selected cell thereby generating minority carrier charge in the charge storage diode. Thereafter the charge is stored in the cell by applying reverse bias to the two diodes for transferring the charge to the junction capacitance of the metal semiconductor diode. The information bit stored in the selected cell is read out by applying a forward bias voltage ramp function to the cell.

INVENTOR
S. G. WAABEN
BY Richard B. Havill
ATTORNEY

CROSS-POINT MATRIX MEMORY USING STORED CHARGE

BACKGROUND OF THE INVENTION

1. Field of the Invention

The invention is a semiconductor cross-point matrix store that is more particularly described as a store including a cross-point matrix having a two-diode memory cell for each cross-point circuit.

2. Description of the Prior Art

In random access store systems, it is often advantageous to arrange memory cells in a cross-point matrix. Such a matrix usually includes two orthogonally arranged sets of selection rail circuits. Such rail circuits are interconnected at the intersections of those rail circuits by cross-point load circuits which include memory elements. These memory elements, or cells, often include semiconductor devices.

Some prior art semiconductor memories included cells in which charge storage diodes are used for retaining information bits. These charge storage diode cells operate in accordance with characteristics that are well known.

For instance, a forward bias across a charge storage diode will cause a forward current to be conducted through the diode. While the forward current exists, the diode presents a low impedance to the current. This forward current causes minority carriers to be stored in the lattice structure of the semiconductor material of the diode. Such lattice structure often is referred to as the bulk of the diode. Information bits can be stored in the bulk of the diode as either one of two different quantities of minority carrier charge.

It is known that within the limit of maximum charge storage capability of any diode, the quantity of minority charge stored therein by forward current is proportional to the magnitude of current conducted through the diode for a predetermined period of time. Thus in the predetermined period of time, a small quantity of charge representing a bit "0" may be stored by causing a low magnitude of forward current through the diode. During a similar period of time, a large quantity of charge representing a bit "1" may be stored in the diode by causing a high magnitude of forward current through the diode.

The quantity of minority carrier charge thus stored in a charge storage diode can be retained for a brief period after termination of the forward current. Upon termination of the forward bias and in the absence of a reverse bias, the stored minority carriers are depleted by recombining with one another across the diode junction. This recombination of minority carriers is completed in a period called the minority carrier lifetime of the diode, which generally is less than 1 microsecond.

In the absence of both forward and reverse bias, the charge representing an information bit can be stored as long as the charge remaining in the diode is sufficient to determine whether a bit "0" or a bit "1" was initially stored in the diode. In prior art diode memory cells, the maximum storage time is limited to the minority carrier lifetime of the charge storage diodes used therein.

Information bits stored in a charge storage diode memory cell can be read out by applying a reverse bias to the diode cell. At any time after a charge representing an information bit is stored in the diode but before the expiration of the minority carrier lifetime of the diode, a reverse bias voltage will cause the stored charge to be discharged from the diode. Such discharge causes a reverse current through the storage diode until the charge stored in the diode is completely discharged. If the magnitude of the reverse current is limited by the circuit, the reverse current pulse duration is proportional to the quantity of charge stored in the diode. During the time when the reverse current is conducted, the impedance of the storage diode is very low. Immediately after the charge is completely discharged, the impedance of the storage diode recovers to a high impedance valve which prevents conduction. When a bit "1" is stored, the quantity of stored charge is greater than the quantity of charge stored when a bit "0" is written. The resulting reverse current therefore lasts longer when bit "1" is stored than when bit "0" is stored.

During readout, a sense amplifier determines whether or not a bit "0" or bit "1" had been stored in the cell by the last previous write-in operation. By gating a sense amplifier to determine the magnitude of the reverse current at a predetermined time after the reverse bias is applied, the current will either be a large magnitude because a bit "1" was stored or will be a very small magnitude because a bit "0" was stored.

Such a prior art charge storage diode variable memory cannot be used in all computer systems requiring a short term random access memory without periodically regenerating the stored information. In some computer systems, a short term random access memory must store information bits for a duration exceeding the minority carrier lifetime of charge storage diodes. As previously stated, prior art memories using charge storage diodes are limited to a storage time equivalent to the minority carrier lifetime of charge storage diodes. Therefore unless stored information is periodically regenerated, such prior art memories using charge storage diodes cannot be used in any random access memory that must store information bits for a duration exceeding the minority carrier lifetime or charge storage diodes.

Even though diodes have limited information storage time, they are desirable components for variable memory cells. To achieve low total cost, memories comprising many memory cells should include memory cells that are as inexpensive as possible. Diode memory cells made in integrated circuit form usually are less expensive than other known memory cells. Thus to achieve a low-cost memory having many memory cells, it is desirable to use diode memory cells.

Since it is desirable to use diode memory cells except for the fact that prior art diode memory cells have a limited storage time, there arises a problem concerning how to extend the storage time of diode memory cells so that inexpensive diode memory cells can be used in electronically variable memories which must store information bits for a duration exceeding the minority carrier lifetime of the diodes.

SUMMARY OF THE INVENTION

It is an object of the invention to develop an inexpensive semiconductor memory cell.

It is another object to develop a semiconductor diode memory cell having an information storage time exceeding the minority carrier lifetime of charge storage diodes.

It is a further object of the invention to transfer charge, stored in the bulk of one semiconductor diode, from that bulk to the junction capacitance of another semiconductor diode for storing an information bit for a duration exceeding the minority carrier lifetime of the diodes.

These and other objects of the invention are realized in an illustrative embodiment thereof in which each memory cell of a cross-point matrix memory includes a pair of diodes in series aiding circuit relationship. The two diodes have different minority carrier lifetimes. An information bit is written into any selected memory cell by forward biasing both diodes of the selected cell for storing minority carrier charge in the bulk of the diode having the longer minority carrier lifetime. Thereafter in response to a reverse bias voltage applied across the two diodes, the minority carrier charge is transferred to the junction capacitance of the diode having the shorter minority carrier lifetime for storage therein. A forward bias voltage ramp function subsequently applied to the selected memory cell causes the information bit, previously stored in that cell, to be read out of the cell.

It is a feature of the invention to utilize a charge storage diode and a metal semiconductor diode in series circuit relationship as a memory cell in a cross-point matrix memory.

Another feature is a memory cell arrangement including two diodes having different minority carrier lifetimes.

Another feature is a means transferring stored minority carrier charge from the bulk of a charge storage diode to the junction capacitance of a metal semiconductor diode by applying a reverse bias voltage across the two diodes.

A further feature of the invention is to readout means applying a forward bias voltage ramp to the two diodes of a selected storage cell for discharging a quantity of charge from the junction capacitance of a metal semiconductor diode therein.

A still further feature is a low impedance-sensing means directly coupled to each memory cell for sensing a magnitude of reverse current representing the quantity of charge that is discharged from any selected memory cell.

BRIEF DESCRIPTION OF THE DRAWING

A better understanding of the invention may be derived from the detailed description following if that description is considered with respect to the attached drawings in which.

DETAILED DESCRIPTION

Figure 1:
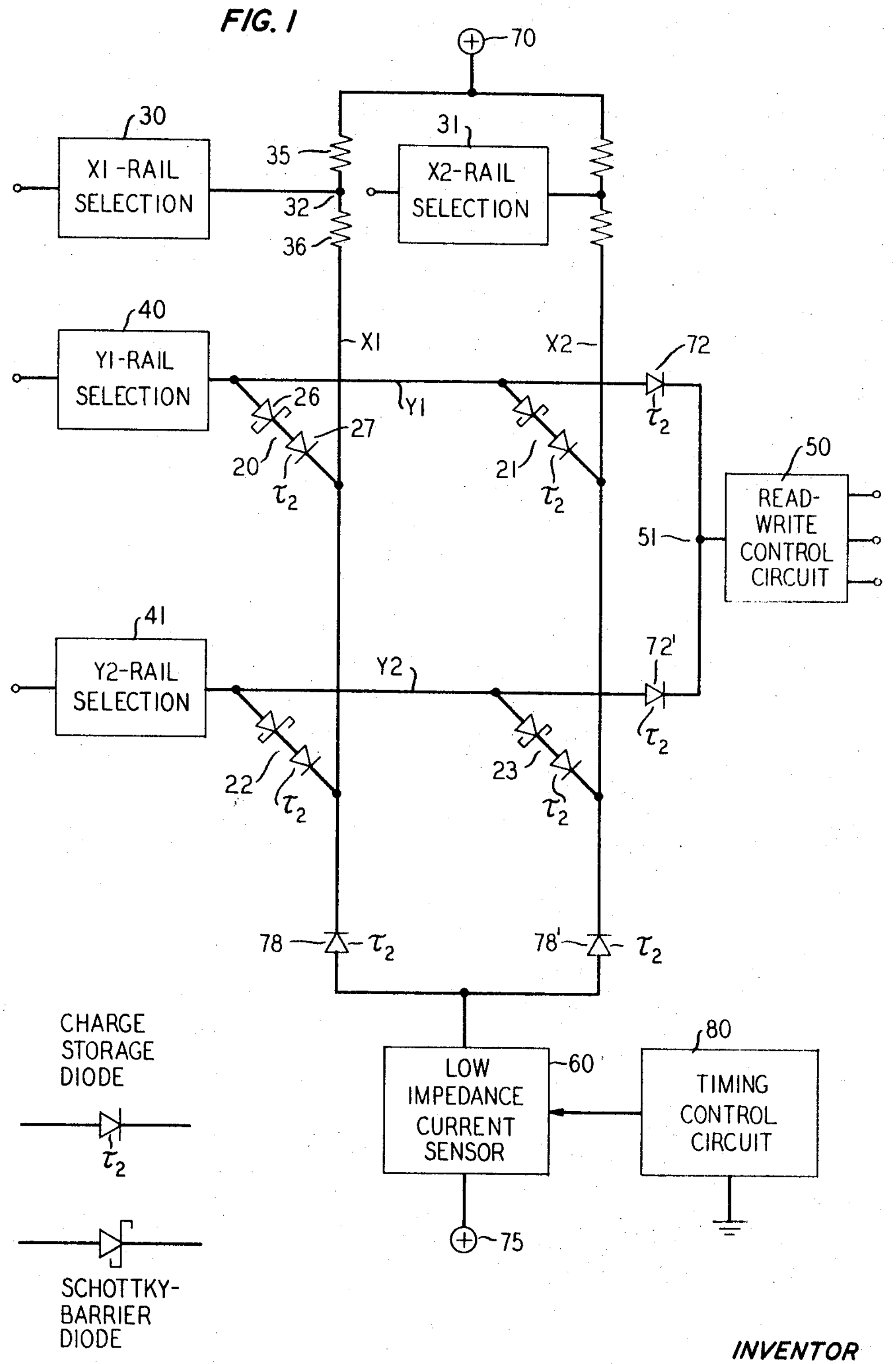
FIG. 1 shows a schematic diagram of a cross-point matrix store, arranged in accordance with the invention.

Referring now to FIG. 1, there is shown a schematic diagram of a plurality of two-diode memory cells 20, 21, 22, and 23 arranged in a cross-point matrix store. One terminal of each of the memory cells 20, 21, 22, and 23 is connected to one of a plurality of vertical selection rails X1 and X2 and another terminal of each of the memory cells 20, 21, 22, and 23 is connected to one of a plurality of horizontal selection rails Y1 and Y2. Thus the two terminals of each of the memory cells connected to one vertical selection rail and one horizontal selection rail of the cross-point matrix. For example, the cell 20 is connected to the vertical selection rail X1 and to the horizontal selection Y1.

In FIG. 1 there are only four memory cells shown for purposes of illustrating the principles of the invention. It is understood that the principles of the invention are readily applicable to cross-point memories having many more than four memory cells. The number of selection rails and rail selection circuits would vary in accordance with the number of memory cells provided in any particular embodiment of the invention.

Write-in and readout operations are accomplished by coincidental energization of the vertical and horizontal selection rails connected to any selected one of the memory cells 20, 21, 22, and 23. X-rail selection circuits 30 and 31, respectively, select the vertical selection rails X1 and X2 for writing and reading operations. Y-rail selection circuits 40 and 41, respectively, select the horizontal selection rails Y1 and Y2 for writing and reading. A read-write control circuit 50 applies write and read drive signals to the horizontal selection rails Y1 and Y2. Any information signal read out of one of the memory cells 20, 21, 22, and 23 is transmitted along one of the vertical rails X1 or X2 to a low-impedance current sensor 60 where those signals are detected.

The memory cell 20, which is a typical memory cell, includes two diodes 26 and 27 having different minority carrier lifetimes $\tau_1$ and $\tau_2$. In addition to the different minority carrier lifetimes, the series combination of the diodes 26 and 27 must have a conduction characteristic in which the maximum magnitude of their reverse current is less than a nanoampere in response to a reverse bias of a few volts. The foregoing diode requirements are readily met by a series combination of a high-barrier Schottky diode, as diode 26, and a charge storage diode, as diode 27.

A high-barrier Schottky diode is a metal semiconductor diode that stores essentially no minority carriers during forward conduction and rapidly recovers from a short circuit impedance to an open circuit impedance in response to any reverse bias applied thereto immediately after conduction in the forward bias mode. Since the Schottky diode stores essentially no minority carriers, its minority carrier lifetime is essentially zero. A more detailed description of such a Schottky diode is presented by M. P. Lepselter and S. M. Sze in their article, entitled "Silicon Schottky Barrier Diode With Near-Ideal I-V Characteristics" Bell System Technical Journal, Volume 47, page 195.

A charge storage diode is a conventional PN junction diode that stores minority carriers during forward conduction and requires a relatively long storage time for discharge of stored minority carriers when a reverse bias is applied thereto immediately after conduction in the forward bias mode. The minority carrier lifetime $\tau_2$ of the charge storage diode is much greater than the carrier lifetime $\tau_1$ of the Schottky diode. A more detailed description of charge storage in PN junction diodes is given by J. L. Moll, S. Krakauer, and R. Shen in their article, entitled, "P-N Junction Charge-Storage Diodes," Proceedings of the IRE, Jan. 1962, page 43.

Referring once again to FIG. 1, an information bit stored in the memory cell 20 is in the form of stored charge, which may be located either in the bulk of the charge storage diode 27 or in the junction capacitance of the Schottky diode 26.

The cells 20, 21, 22, and 23 are subject to the following four operations: (1) standby, (2) write-in, (3) storage, and (4) readout.

1. Standby Operation

In standby operation, the horizontal rails Y1 and Y2 are held at a potential level that is lower than the potential level of the vertical rails X1 and X2. The anodes of the diodes of the cells are connected to the horizontal selection rails and the cathodes of those diodes are connected to the vertical selection rails. Thus the two diodes in each of the memory cells 20, 21, 22, and 23 are reversely biased and cut off.

During standby operation, the potential of the horizontal selection rails Y1 and Y2 is determined by their associated Y-rail selection circuits 40 and 41 and by the read-write control circuit 50. At the same time, the potential level of the vertical rails X1 and X2 is determined by a circuit combination including a power supply 70, the X-rail selection circuits 30 and 31, the low impedance sensor 60, and a power supply 75.

Each of the power supplies 70 and 75 is shown schematically as a circle enclosing a plus sign. This represents that the indicated circuit node is connected to the positive terminal of a power supply having its negative terminal connected to ground. Such representation is also used in other figures of this application. In additional figures, a circle enclosing a negative symbol indicates a circuit node connected to the negative terminal of a power supply having its positive terminal connected to ground.

Figure 2:
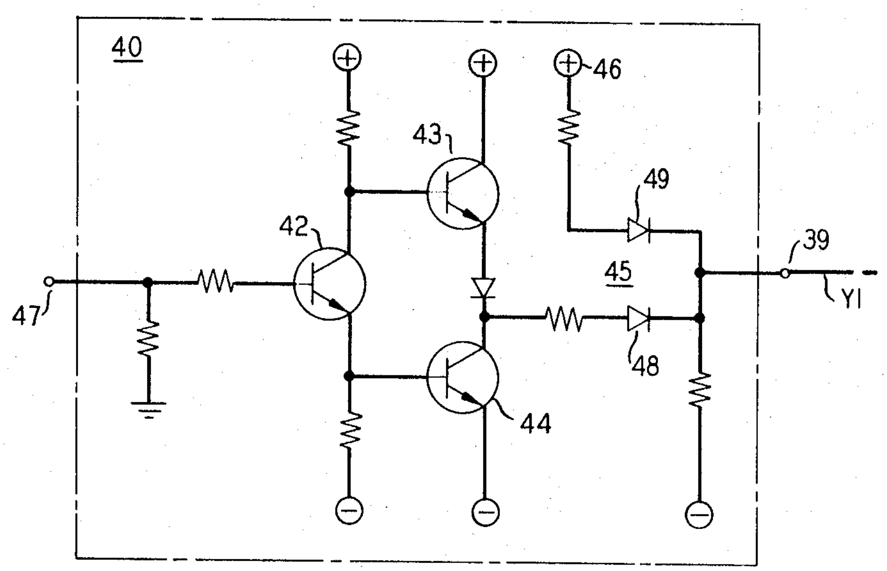
FIG. 2 shows a schematic diagram of a rail selection circuit used in the cross-point matrix store of FOG. 1.

FIG. 2 shows an illustrative circuit arrangement that is used for the Y-rail selection circuit 40. In FIG. 2 an output terminal 39 of the Y-rail selection circuit 40 is directly connected to one terminal of the horizontal selection rail Y1, also shown in FIG. 1. In FIG. 1, another terminal of the rail Y1 is coupled through a charge storage diode 72 to an output terminal 51 of the read-write control circuit 50.

The Y-rail selection circuit 40 of FIG. 2 includes a conventional transistorized phase splitter stage 42 driving a push-pull stage 43, 44 into one input of a diode OR-gate 45. A positive potential supply 46 is coupled to another input of the diode OR gate.

During standby a positive potential level is applied to an input terminal 47 thus enabling both the phase-splitter transistor 42 and the transistor 44 and disabling the transistor 43. A negative potential signal is coupled through the transistor 44 to one input of the diode OR-gate 45. As a result, a diode 48 is cut off and a relatively low near ground potential is coupled to the output terminal 39 and the horizontal selection rail Y1.

Figure 3:
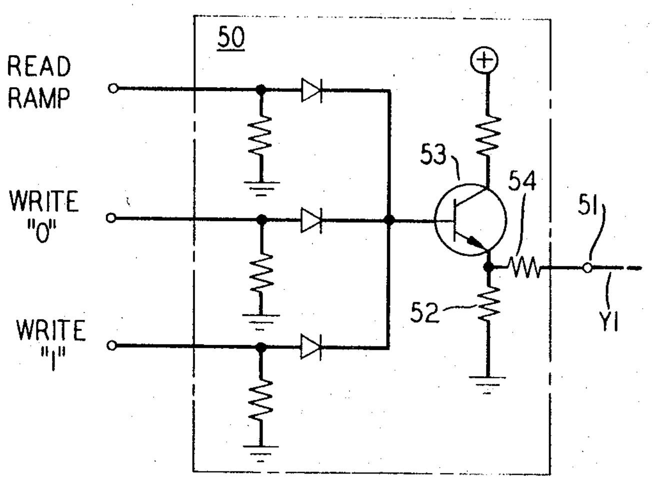
FIG. 3 shows a schematic diagram of a control circuit used in the cross-point matrix store of FIG. 1.

FIG. 3 shows an illustrative circuit arrangement that is used for the read-write control circuit 50. In FIG. 3, there is shown a resistor 52 coupling the output terminal 51 to ground. The read-write control circuit 50 includes a three-input diode OR gate and an emitter follower circuit 53. During standby operation, all input signals to the read-write control circuit 50 are at ground potential. Since all of the inputs are at ground potential, the emitter-follower transistor 53 is cut off and ground potential is coupled through the resistors 52 and 54 to the output terminal 51.

It has been shown that during standby operation the Y-rail selection circuit 40 of FIG. 1 applies a low near ground potential to one end of the horizontal selection rail Y1. The read-write control circuit 50 couples ground potential through resistors 52 and 54 to the other end of the horizontal selection rail Y1. The aforementioned low potential is insufficient to forward bias the charge storage diode 72 into conduction and no charge is stored therein. Therefore, the potential of the horizontal selection rail Y1 is held at a low near ground potential during standby operation.

The potential on the horizontal selection rail Y2 is similarly held near ground potential by the Y2-rail selection circuit 41 and the read-write control circuit 50. The Y2-rail selection circuit 41 is of course similar to the circuit 40 of FIG. 2.

In FIG. 1 the vertical selection rail X1 is held at a relatively high-positive potential that is determined by the potential levels of the power supply 70 and by X1-rail selection circuit 30.

Figure 4:
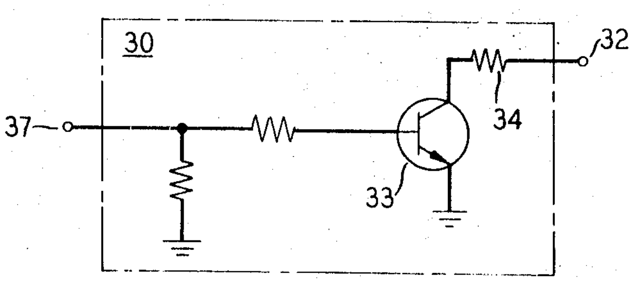
FIG. 4 shows a schematic diagram of another rail selection circuit used in the cross-point matrix store of FIG. 1.

FIG. 4 shows an illustrative circuit arrangement used for the X1-rail selection circuit 30. The arrangement of FIG. 4 includes a conventional transistor switch that is cut off in response to a ground level input signal during standby operation. Since a transistor 33 is coupled by way of a resistor 34 in FIG. 4 and a resistor 35 in FIG. 1 to the supply 70 and since the transistor 33 is cut off during standby operation, the output of X-rail selection circuit 30 is held at a high-positive potential during standby operation. This positive potential is coupled through resistor 36 to the vertical selection rail X1 for holding that rail at the high-positive potential during standby operation. The potential of the supply 75 is less than the potential of the X-rails so that diodes 79 and 78′ are reverse biased.

The vertical selection rail X2 is also held at a high potential level during standby operation. The X2-rail selection circuit 31, which is similar to the circuit 30 of FIG. 4, controls this potential level of the selection rail X2.

Thus during standby operation, the horizontal selection rails Y1 and Y2 are held at a low near ground potential and the vertical selection rails X1 and X2 are held at a relatively high-positive potential. As a result of these potential conditions, the two diodes of each of the memory cells 20, 21, 22, and 23 are back biased and cut off. However the potential on the rails X1, X2, Y1, and Y2 is such that charge storage diodes 72, 72′, 78, and 78′ are reverse biased.

2. Write-in Operation

During each write-in operation, one horizontal rail and one vertical rail are energized to select one of the memory cells for write-in. Since cell 20 is a typical cell, the exemplary write-in operation will describe the operation of cell 20.

Selection of the cell 20 occurs by changing the potential of the left-hand end of the horizontal rail Y1 of FIG. 1 by means of the Y1-rail selection circuit 40 and by changing the potential of the vertical rail X1 by means of the X1-rail selection circuit 30. The selection circuits 30 and 40 are enabled to change the potential of the selection rails X1 Y1 in response to input signals applied coincidentally to the circuits 30 and 40. At the same time that the resulting potential changes occur on the selection rails X1 and Y1, the vertical selection rail X2 is held at the same high potential level used during standby operation. Concurrently, the Y2-rail selection circuit 41 holds the left-hand end of the horizontal selection rail Y2 at the same low potential level used in standby operation.

Referring now to FIG. 4, there is a positive potential applied to the input terminal 37 of the X1-rail selection circuit 30 so that the output 33 conducts and couples ground potential to the output terminal 32. This ground potential is thereafter coupled through the resistor 36, shown in FIG. 1, to the vertical selection rail X1. Selection current is conducted from the supply 75 through the diode 78, the rail X1, and the resistor 36 to the selection circuit 30. Minority carriers are thus stored in the diode 78.

Referring now to FIG. 2, a ground potential signal applied to the input terminal 47 disables the transistor 42. As a result, the transistor 43 is enabled and the transistor 44 is cut off. A low-positive potential coupled through the transistor 43 to an input of the diode OR-gate 45 at the anode of diode 48. This low-positive potential is coupled through the OR-gate 45 to the left-hand end of the horizontal selection rail Y1. This potential is sufficient to forward bias the diode 72 which stores charge.

Thereafter and while the rails X1 and Y1 remain selected the right-hand end of the horizontal selection rail Y1 in FIG. 1 is coupled to one of two positive potential levels produced by the read-write control circuit 50. Referring once again to FIG. 3, either the write "0" or the write "1" input may be activated. In the exemplary operation being described, it is assumed that the write "1" input is activated by a relatively high positive potential level signal. In response thereto, the output signal at terminal 51 of the emitter-follower transistor 53 is also at a relatively high-positive potential level that is coupled through diode 72, in FIG. 1, to the horizontal selection rail Y1. The charge storage diode 72 is able to couple such a signal through to the horizontal rail Y1 because minority carriers, previously stored in the charge storage diode 72, discharge and cause a reverse current through diode 72 in response to the reverse bias applied thereacross. The minimum positive potential level at output terminal 51 for the write "1" condition is of a magnitude sufficient to conduct current through diode 72, the two diodes in cell 20, and the resistor 36 of FIG. 1, and through the resistor 34 and the transistor 34 of FIG. 4 to ground.

Therefore, the horizontal rail Y1 has a relatively high-positive potential applied to its left-hand end and a relatively high-positive potential level applied to its right-hand end establishing on the rail Y1 a positive potential level, well above the ground potential level applied thereto during standby operation. At the same time and as previously described, the vertical selection X1 is held near ground potential by X1-rail selection circuit 30.

Thus the diodes 26 and 27 in cell 20 are forward biased into conduction and minority carriers are stored in the bulk of the charge storage diode 27 to represent the information bit "1" being written into the memory cell 20.

While the cell 20 is thus conducting in the forward biased mode, the memory cells 21, 22, and 23 remain reversely biased. Although the vertical selection rail X1 is held near ground potential by the X1-rail selection circuit 30, the cell 22 remains reversely biased because the Y2-rail selection circuit 41 holds the left-hand end of the horizontal selection rail Y2 at a low-positive potential which is insufficient to bias the diodes of cell 22 into conduction. Concurrently, the positive potential level on the horizontal selection rail Y1 is insufficient to forward bias the diodes of cell 21 into conduction because the X2-rail 2- rail selection circuit 31 holds the vertical selection rail X2 at a high-positive potential. Cell 23 remains reversely biased by potential conditions similar to the potential conditions for standby operation.

If an information bit "0" were to be written into the cell 20 instead of the bit "1" while the rails X1 and Y1 are selected, an input signal would be applied to the write "0" input of the read-write control circuit 50 shown in FIG. 3. The input signal applied to the write "1" input would be ground. Then the read-write control circuit 50 produces a write "0" output signal which is coupled through the charge storage diodes 72 to the right-hand end of the horizontal selection rails Y1 and Y2. The maximum value of the write "0" output signal at the terminal 51 is limited in magnitude so that little if any current can be conducted through diodes 72, 26, and 27 and the resistor 36 to the X1 rail selection circuit 30 in FIG. 1. As a result, little charge is stored in the charge-storage diode 27 in response to a write "0" operation. The other memory cells 21, 22, and 23 remain cut off, as they were cut off for the exemplary operation wherein a bit "1" was written into the memory cell 20.

Recall from the foregoing discussion that the quantity of charge stored in the bulk of a charge storage diode in response to a forward bias current for a fixed time period is proportional to the magnitude of the forward current through the diode. The X1-rail selection circuit 30 and the y1 selection circuit 40 hold the rails X1 and Y1 selected until a sufficient time period elapses for the current conducted through the memory cell 20 during the write "1" operation to store a predetermined quantity of charge in the charge storage diode 27. As soon as that period elapses, the X1-rail selection circuit 30 and the Y1 selection circuit 40 return to their respective standby states. Thus when a bit "0" is written into the cell 20, the predetermined quantity of charge is stored in the diode 27. However, when a bit "0" is written into the cell 20, the diode 27 stores only a small portion of the predetermined quantity of charge because the time period is the same and the forward current established during the write "0" operation is much smaller than the current established in the write "1" operation.

If an input information bit were to be written into any cell other than cell 20, the write-in operation is similar to the previously described operation except that a different combination of rail selection circuits would be operated depending upon which cell is to be selected. The potential levels of the selection rails X1, X2, Y1, and Y2 will vary in accordance with which rails are selected and which rails are not selected.

3. Storage

The rail selection circuits 30, 31, 40, and 41 and the read-write control circuit 50 are all returned to their standby states to store the information bit "1" which was written into cell 20. As a result of the return to standby operation, all of the diodes in the cells 20, 21, 22, and 23 are reversely biased. For the exemplary write-in operation previously described, the quantity of charge stored in the charge storage diode 27 is transferred from the bulk of diode 27 to the junction capacitance of the Schottky diode 26. If a bit "0" has been written into cell 20, the quantity of charge transferred to the junction capacitance of diode 26 would be substantially smaller than the quantity of charge transferred thereto when a bit 1" is stored. If an information bit had been written into any other cell, such as cell 22, the charge stored in the bulk of the charge storage diode of the cell 22 would likewise be transferred to the junction capacitance of the Schottky diode in cell 22.

Very little charge leakage of stored charge occurs from the cell 20 or from any other cell during storage because of the low reverse current characteristic chosen for the two diodes 26 and 27. Even though the charge storage diode 27 by itself can conduct a large reverse current, the series circuit path through the diodes 26 and 27 is effectively an open circuit during storage because the Schottky diode 26 stores very few minority carriers during forward conduction. The diode 26 recovers to cut off very rapidly keeping the reverse current through the cell 20 very low. Since the reverse current is low, the charge stored on the junction capacitance of the Schottky diode 26 is retained for a relatively long duration with respect to memory access time. The storage duration of the memory cells 20, 21, 22, and 23 is approximately 1 second because of the characteristics specified for the diodes 26 and 27. Thus information bits can be stored as long as 1 second without the need to regenerate the bits and rewrite them into the memory cells.

4. Readout

Readout is accomplished by selecting one cell out of the cells 20, 21, 22, and 23 of the matrix and then applying a readout ramp signal to the selected cell. The cell 20 is selected by enabling the vertical rail X1 and the horizontal rail Y1 through means of the X1-rail selection circuit and the Y1-rail selection circuit, as previously described for the write-in operation. The diodes 72 and 78 conduct and store minority carriers. With the cell 20 thus selected for readout, the read-write control circuit 50 applies to the horizontal rails Y1 and Y2 a positive ramp voltage instead of the level potentials used for the write-in. The ramp voltage applied to the rails Y1 and Y2 is shown in FIG. 5.

Referring once again to FIG. 3, this ramp voltage is produces at the output terminal 51 in response to another ramp voltage applied to the READ RAMP input terminal because the emitter-follower transistor 53 produces on the terminal 51 an output signal that follows the applied input signal. The ramp voltage function at the output terminal 51 is coupled through the charge storage diode 72, shown in FIG. 1, to the horizontal rail Y1. The diode 72' remains reverse biased and cut off because there are no minority carriers stored therein. The ramp function has a positive polarity so that it forward biases the diodes 26 and 27 of the selected cell 20 and so that it reverse biases the charge storage diodes 72 and 78.

Figure 5:
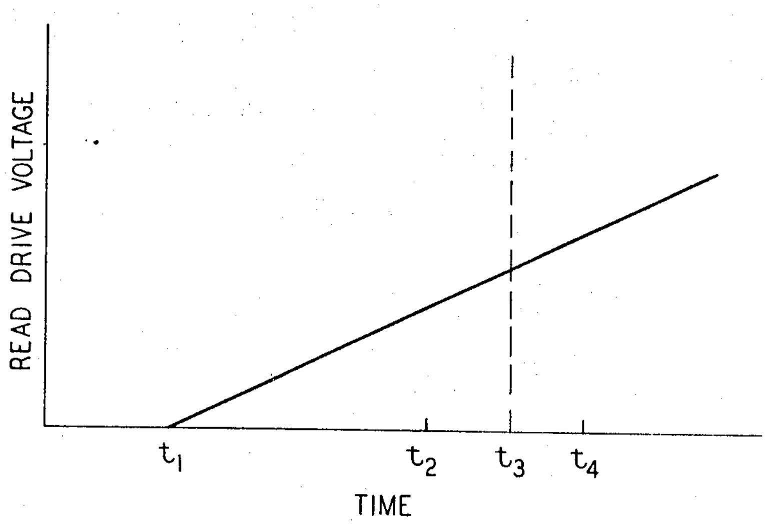
FIG. 5 shows a waveform of a ramp voltage used for reading information bits out of selected cells of the cross-point matrix store.
Figure 6:
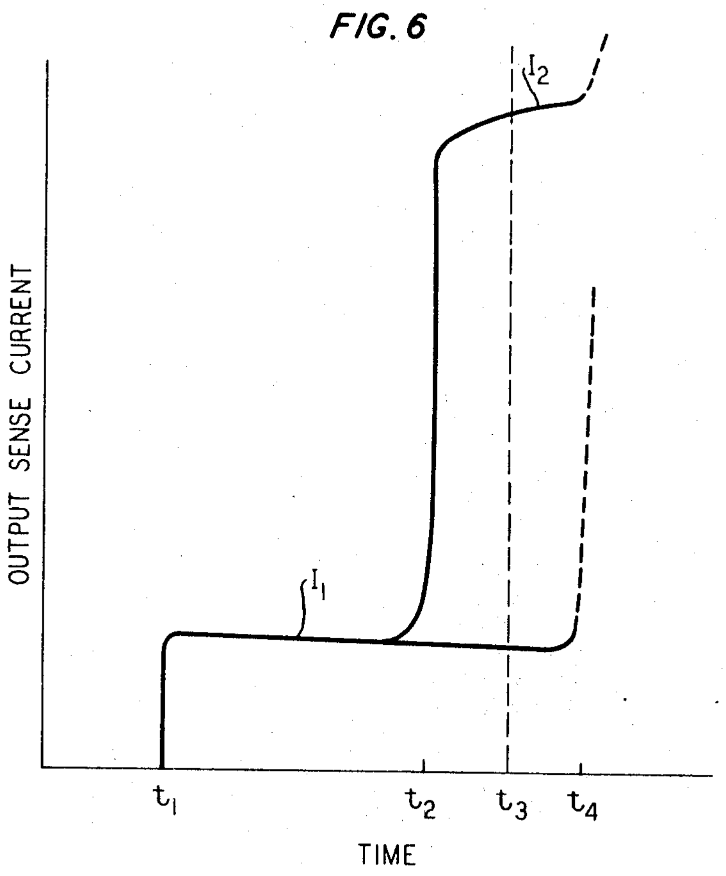
FIG. 6 shows waveforms of readout current produced by any selected cell of the cross-point matrix store.

When the ramp function of FIG. 5 is first applied to the cell 20 between the means $t_1$ and $t_2$, there is insufficient magnitude of potential to bias the diodes 26 and 27 into significant forward conduction. FIG. 6 shows the magnitude to current conducted through cell 20 and the low-impedance current sensor circuit 60. As shown in FIG. 6 between the times $t_1$ and $t_2$, conduction through the diodes 26 and 27 to the low-impedance current sensor circuit 60 is limited to a low first level of current $I_1$. The magnitude of this first level of current $I_1$ is determined by the rate of change of the magnitude of the voltage ramp and by the series circuit arrangement of the junction capacitances of the diodes 26 and 27.

As the magnitude of the potential ramp increases, it reaches either at time $t_2$ or $t_4$ a magnitude sufficient to cause the charge storage diode 27 to conduct substantial forward current. In FIG. 6 the current is shown rising at two different times $t_2$ and $t_4$ because of different quantities of charge which may be stored in the junction capacitance of diode 26, i.e., representing a bit "1" or a bit "0." These different quantities of stored charge cause this second step of current to occur at different times. The second step of current occurs at time $t_2$ when the cell 20 is storing a bit "1" because a large quantity of charge is stored in the junction capacitance of the diode 26. The second step of current is delayed until time $t_4$ when a bit "0" is stored in the cell 20 because a small quantity of charge is stored in the junction capacitance of diode 26. The extra period of time, from the time $t_2$ to the time $t_4$, elapses while the ramp function of FIG. 5 rises sufficiently in magnitude to bias the diode 27 into substantial forward conduction while the diode 26 is storing the smaller charge of bit "0." The magnitude of the second level $I_2$ of current is determined by the rate of change of the magnitude of the voltage ramp and by the junction capacitance of the Schottky diode 26.

When the magnitude of the ramp voltage increases somewhat further, both diodes 26 and 27 conduct current in their forward conduction mode. The current then conducted through the diodes 26 and 27 rises exponentially in value corresponding to the conventional forward conduction characteristics of diodes, as shown by dotted lines commencing approximately at the time $t_4$ in FIG. 6.

In FIG. 1 readout current is conducted from the read-write control circuit 50 through diode 72, selection rail Y1, the cell 20, the selection rail X1, the diode 78, and the low-impedance current sensor 60 to the source 75. The diodes 72 and 78 conduct current in their reverse current mode because minority carriers were previously stored therein during the standby and storage operations. The diodes 72' and 78' remain cut off because they are storing no minority carriers.

The low-impedance sensor 60 includes a conventional low-input impedance detector which is capable of detecting the difference between the magnitude of the first level of current and the magnitude of the second level of current.

The low-impedance sensor 60 is gated by signals from a timing control circuit 80 so that the sensor 60 samples the readout current at a time $t_3$ in FIGS. 5 and 6, which time occurs between the times $t_2$ and $t_4$. If the readout current is at the first level $I_1$ when the sample time $t_3$ occurs, the sensor 60 indicates that a bit "0" was stored in the cell 20 at time $t_1$. On the other hand, if at the sample time $t_3$ the readout current is as the second level $I_2$, the sensor 60 indicates that a bit "1" was stored in the cell 20 at time $t_1$.

Information bits stored in the other cells 21, 22, and 23 can be read by a similar readout operation in which different rail selection circuits are enabled to select the particular information bit to be read out.

Thus there has been described a cross-point matrix store arrangement wherein the memory cells 20, 21, 22, and 23 include just two diodes having different minority carrier lifetimes. The store is arranged for random access writing and reading. Information bits stored in the individual cells can be retained therein for approximately 1 second without regeneration. This storage time is greater than the minority carrier lifetime of known charge storage diodes and is a sufficient duration for performing scratch pad memory functions for electronic switching systems used in the telephone industry and in commercial computers.

The foregoing detailed description is illustrative of one embodiment of the invention, and it is to be understood that additional embodiments thereof will be obvious to those skilled in the art. The embodiment described herein together with those additional embodiments are considered to be within the scope of the invention.

What is claimed is:

1. A combination comprising
   a plurality of memory cells, each cell including a first diode having a first minority carrier lifetime and a second diode having a second minority carrier lifetime,
   write-in means for forward biasing the first and second diodes of a selected one of the cells and storing one of two different quantities of charge in the bulk of the first diode, and
   means for back biasing the first and second diodes of the selected cell and transferring the stored quantity of charge from bulk of the first diode to a junction capacitance of the second diode.

2. A combination in accordance with claim 1 further comprising
   readout means applying a forward bias ramp to the selected cell for driving the stored quantity of charge from the junction capacitance of the second diode of that cell.

3. A combination in accordance with claim 2 further comprising
   means directly coupled to the selected cell for sensing the quantity of charge driven out of that cell.

4. A combination in accordance with claim 3 further comprising
   a first plurality of parallel selection rails,
   a second plurality of parallel selection rails arranged orthogonally with the first plurality of rails, and
   each memory cell connects one selection rail of the first plurality of rails with one rail of the second plurality of rails.

5. A combination in accordance with claim 4 further comprising
   a first plurality of charge storage diodes, each diode coupling the write-in and readout means to one of the rails of the first plurality of selection rails.

6. A combination in accordance with claim 5 in which
   the sensing means comprise a low-impedance current sensor, said combination further comprising
   a second plurality of charge storage diodes, wherein each diode couples one rail of the second plurality of selection rails to the sensing means.

7. A combination in accordance with claim 6 in which
   timing means gates the current sensor to sample a signal current through the first and second diodes when the bias ramp reaches a predetermined value, thereby determining which one of the two quantities of charge was stored in the selected memory cell.

8. The method of storing an information bit in a two-diode memory cell with in a cross-point matrix and retrieving the bit therefrom, the method comprising the steps of
   selecting the cell by activating predetermined selection rails of the matrix,
   forward biasing the cell by applying a write-in drive signal to one of the predetermined selection rails for storing quantity of charge in the bulk of a first one of the diodes of the cell,
   transferring the quantity of stored charge from the bulk of the first diode to a junction capacitance of second diode of the cell by applying a reverse bias to the first and second diodes of the cell,
   reselecting the cell by activating the same predetermined selection rails of the matrix,
   driving the stored charge from the junction capacitance of the second diode by applying a forward bias drive ramp to the first and second diodes, and
   sensing the current conducted through the cell when the bias ramp reaches a predetermined magnitude.

9. A combination comprising
   a plurality of memory cells, each cell including first and second diodes,
   means for forward biasing the first and second diodes of a selected one of the cells and storing a quantity of charge in the bulk of the first diode of that cell, and
   means for reverse biasing the first and second diodes of the selected cell and transferring the quantity of charge stored in the bulk of the first diode to a junction capacitance of the second diode.

10. A combination in accordance with claim 9 further comprising
   a detector coupled to the cells, and
   means for applying a forward bias to the first and second diodes of the selected cell and driving the quantity of charge from the junction capacitance of the second diode of that cell to the detector.

* * * * *